Sept. 20, 1960   H. BROCKMANN ET AL   2,953,495
ANTICANCER ANTIBIOTIC ACTINOMYCIN C AND ITS PREPARATION
Filed July 22, 1954
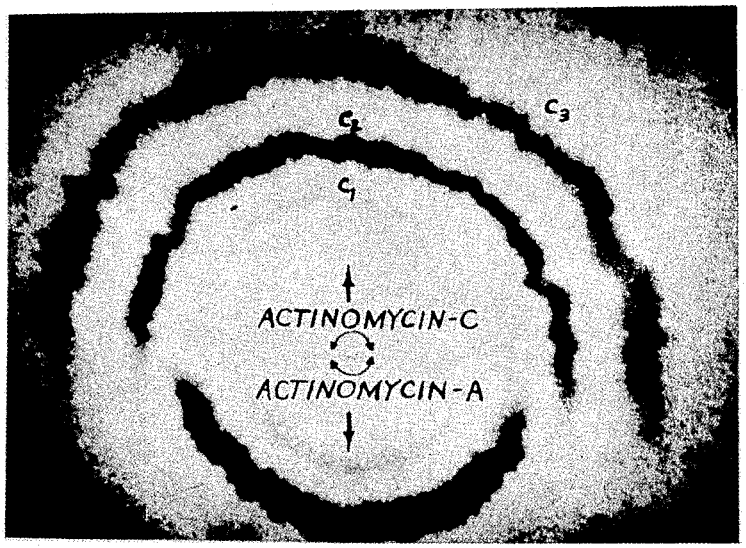
INVENTOR.
HANS BROCKMANN
ARNOLD BOHNE
BY
ATTORNEY

United States Patent Office 2,953,495
Patented Sept. 20, 1960

2,953,495

ANTICANCER ANTIBIOTIC ACTINOMYCIN C AND ITS PREPARATION

Hans Brockmann, Gottingen, and Arnold Bohne, Wuppertal-Barmen, Germany, assignors to Schenley Industries, Inc., New York, N.Y., a corporation of Delaware Filed July 22, 1954, Ser. No. 444,946

9 Claims. (Cl. 167—65)

This invention relates to new and useful substances of the antibiotic type, i.e., chemical substances which are produced by microorganisms and which are in turn effective in inhibiting the growth, or destroying other microorganisms, and to a method of process for producing such substances. More particularly, the invention contemplates the provision of a new antibiotic substance and embraces processes for its production by fermentation, methods for its recovery and concentration from crude solutions including such fermentation media, the purification thereof and the production of its salts.

The novel antibiotic substance of the invention is formed by cultivation under controlled conditions in a suitable nutrient medium, of a hitherto unknown species of the group of microorganisms designated, Actinomyces, which species we have designated, Streptomyces chrysomallus.

Our new antibiotic substance has, for convenience, been designated during various stages of its development as Compound HBF–386, Actinochrysin, Actinomycin C and Sanamycin (trade name—Germany). For present purposes, the antibiotic will be referred to as "Actinomycin C" since this is the most commonly used name heretofore associated with the antibiotic substance in the technical literature.

In past years, a whole new series of antibiotically effective strains of Actinomyces have been identified and classified under previously known species, such, for example, as the well established species Streptomyces albus, Streptomyces lavendulae (U.S. Patent No. 2,422,230), Streptomyces fradiae, and Streptomyces griseus. Other strains of recent origin could not be classified under existing species and these have given rise to such independent species as, Streptomyces antibioticus, Streptomyces flaveolus, Streptomyces aureofaciens, Streptomyces bikiniensis, Streptomyces rimosus, etc. Our strain is not assignable to any existing species, as will appear more fully hereinafter, and has therefore been designated as the new species, Streptomyces chrysomallus.

This Actinomycin C-producing strain, Streptomyces chrysomallus, was isolated during the course of our investigations of many other antibiotic substances derived from Actinomycetes. The new strain has certain characteristics similar to those of the strains, Streptomyces fulvissimus (H. L. Jensen, "Actinomycetes in Danish Soils," Soil Science, 30, pages 59–77, 1930) and Streptomyces flaveolus, and also possesses a number of properties in common with Waksman's well known strain, Actinomyes antibioticus (U.S. Patents Nos. 2,378,449 and 2,378,876; also Journal of Bacteriology, 42, pages 231–249, August 1941), from which the two distinct antimicrobial substances, "Actinomycin A" and "Actinomycin B," were isolated by Waksman et al.

A culture of this new microorganism, Streptomyces chrysomallus, has been deposited in the Culture Collection Section, Fermentation Division of the Northern Regional Research Laboratory at Peoria, Illinois, and has been added to its permanent collection of microorganisms as NRRL–2250.

The predominant morphological characteristics of the new strain are as follows:

(I) *Macroscopic examination.*—The strain forms a strikingly soft mycelium on all culture media, a characteristic which clearly distinguishes it from all similar strains.

(II) *Microscopic examination.*—Substrate mycelium consisting of long, branched hyphae, rich in small staining granules. Aerial mycelium forms conidia chains which are not clustered, white to weakly yellow; no spirals observed; conidia oval to elliptic.

Some cultural characteristics of our new species are given below in tabular form:

TABLE I

*Streptomyces chrysomallus* nov. spec.

MORPHOLOGICAL AND PHYSIOLOGICAL BEHAVIOR ON DIAGNOSTIC MEDIA

| Culture Medium | Growth Characteristics | Color Characteristics | | Other Observations |
|---|---|---|---|---|
| | | Aerial Mycelium | Soluble Pigment | |
| (1) Synthetic solution ($K_2HPO_4$; $MgSO_4$; KCL; $FeSO_4$; $NaNO_3$; and Glycerin). | Surface growth forming cohesive coat, back yolk-colored. | White to gray-white, submersed profusion of yellowish flakes. | Light-yellow. | Aerial mycelium velvety. |
| (2) Synthetic Agar (Same as solution—agar added). | Good, crusty. Surface light yellow. | White. | Golden-yellow. | Aerial mycelium mealy. |
| (3) Glucose Liquor. | Surface growth a cohesive coat, back yolk-colored. | White, submersed profusion of yellowish flakes. | do. | Aerial mycelium velvety. |
| (4) Glucose Agar. | Growth good, wrinkled, deep-yellow. | Gray white. | Light-yellow to golden-yellow. | Aerial mycelium mealy dust. |
| (5) Glucose - asparagine - agar. | Growth moderate, smooth, nearly colorless to yellowish. | White. | Very faintly yellowish. | Aerial mycelium dusty. |
| (6) Calcium malate-agar. | Good growth, thin, smooth, colorless to faintly yellowish. | Gray-white. | None. | Aerial mycelium mealy dust. |

TABLE I—Continued

| Culture Medium | Growth Characteristics | Color Characteristics | | Other Observations |
|---|---|---|---|---|
| | | Aerial Mycelium | Soluble Pigment | |
| (7) Gelatin | Very thick coat, light to dark yellow. | White | Yellowish-brown | Aerial mycelium mealy dust. Strong liquefaction. Soluble pigment coloration only in liquefied portion of medium. |
| (8) Starch Plate | Growth very slow, substrate mycelium uncolored, also in back. | do | None | Aerial mycelium dusty. Starch is strongly hydrolyzed. |
| (9) Nutrient Agar | Growth weaker, slightly wrinkled, glossy golden-yellow. | do | Golden-yellow | Aerial mycelium very slightly dusty. |
| (10) Potato | Growth strong, wrinkled, yolk-colored, later brownish-yellow or bronze. | White to yellowish-white. | | Aerial mycelium wooly. |
| (11) Carrot | Growth much weaker, smooth, in small lustrous spherical colonies, yellow. | White | | Aerial mycelium very slightly dusty. |
| (12) Cellulose | Very poor growth. | | | |
| (13) Milk Agar | Strong colorless growth, light-yellow in back. | Snow-white, later yellowish-white. | | Aerial mycelium wooly. Completely clear proteolytic zone of 7 mm. Litmus slightly reddish. (Disintegration of casein.) |
| (14) Peptone Bouillon Agar | Growth restricted. | Whitish, weakly yellow. | | |
| (15) Litmus Milk | Reduced growth with color turning to blue. | | | No precipitation of casein. The medium is cleared to a certain extent. (Disintegration of casein.) |
| (16) Cherry Syrup | Good growth. | | | |
| (17) Glycocoll Agar | Abundant growth. | White to weakly yellow. | | Mycelium golden-yellow, soft and loose, easy to scratch off, distinctly wrinkled. |
| (18) Starch-casein-agar | Growth very good, colorless, back pale yellow. | Chalky white | None | Aerial mycelium mealy dust. |
| (19) Loeffler's Blood Serum | Yellowish-brown mycelium, back light brown. | None | Light brown | Rapid and complete liquefaction. |

The following cultural characteristics of the species *Streptomyces fulvissimus* (Jensen) obtained upon cultivation on starch-casein-agar and Loeffler's blood serium (media 18 and 19 above) indicate important differences between this strain and *Streptomyces chrysomallus*:

TABLE II

*Streptomycin fulvissimus* (Jensen)

| Media | Characteristics |
|---|---|
| Loeffler's Blood Serum | Vegetative mycelium, reddish-brown; no aerial mycelium; soluble pigment yellowish; no liquefaction. |
| Starch-Casein-agar | Growth good, yellowish-brown; aerial mycelium thick, smooth, lead-gray; soluble pigment dull yellow to orange. |

Other predominant differences between the species *Streptomyces fulvissimus* and *Streptomyces chrysomallus* are found in the fact that, *fulvissimus* forms a brown substrate mycelium on gelatin, no aerial mycelium, and no pigment; on nutrient agar the substrate mycelium is a deep reddish-brown; on potato it is rust-brown; and the aerial mycelium is lacking on potato or occurs in scant traces only.

Our species differs from the species *Streptomyces flaveolus* with respect to color, formation of an aerial mycelium, pigment coloration, and growth characteristics on the potato medium. An essential difference resides in the fact that *Streptomyces chrysomallus* lacks capacity for reducing nitrate.

The morphological and physiological properties of *Streptomyces chrysomallus* are clearly different from those of Waksman's *Streptomyces antibioticus*. Some of the more important cultural differences between these species are given below in tabular form:

TABLE III

| Medium | Strep. Chrysomallus nov. spec. | Strep. Antibioticus (Waksman) |
|---|---|---|
| Gelatin | Heavy surface growth, light to dark-yellow; aerial mycelium white. | Dark brown surface growth; aerial mycelium gray. |
| Potato | Aerial mycelium wooly, white to yellowish white. | No aerial mycelium. |
| Carrot | Growth faint, yellow; aerial mycelium very slightly dusty, white. | Growth faint, cream-colored to brownish; no aerial mycelium. |

The Actinomycin C-producing microorganism is further identified by the following characteristics:

No reduction of nitrate
No production of a hydrogen sulfide

In culture media containing sodium nitrate as the source of nitrogen, the growth is luxuriant and dyestuff formation is good when glycerin, glucose, lactose, and dextrin are each used as the carbon source but only fair when sucrose and starch are used. In culture media containing glycerin as the source of carbon, good growth and dyestuff formation are obtained when sodium nitrate, potassium nitrate and glycocoll are each used as the source of nitrogen, but both are somewhat poorer when urea is used and still poorer when ammonium sulfate is used.

In thus describing the particular organism used in the production of our new antibiotic substance, Actinomycin C, it is to be understood that the description is by way of illustration only and we do not wish to limit ourselves to merely the organism or organisms which fully meet the above characteristics. In particular, we intend that the scope of the invention shall also include the use of organisms which may be produced from *Streptomyces chrysomallus* by mutating agents such as X-ray or ultra-violet radiation, etc.

Actinomycin C, as for other known antibiotics derived from Actinomycetes, exhibits a strong antibiotic activity in vitro against Streptococci, Pneumococci and the following organisms in the dilutions shown:

Staphylococcus aureus _____ 1:20 million
Bacillus subtilis _____ 1:100 million
Bacillus coli _____ 1:10,000

BACTERIAL SPECTRUM

In a nutrient solution consisting of the following ingredients in the proportion shown, Horse serum _____ 8
Glucose solution (10%) _____ 8
Aqueous phenol red (sat. sol.) _____ 1
Water _____ 24

Actinomycin C was found to inhibit the growth of various microorganisms in the following concentrations:

TABLE IV

| Microorganism: | mcgm. Actinomycin C./ccm. |
|---|---|
| Streptococci | 0.09–1.25 |
| Enterococci | 0.09–2.5 |
| Staphylococci | 0.39–>5.0 |
| Pneumococci | 0.19–1.25 |
| Bacillus subtilis | <0.09–1.25 |
| Corynebacterium diphtheroides | 0.09–1.25 |
| Bacillus coli | >100 |
| Proteus vulgaris | >100 |

In tests conducted on experimentally infected mice, Actinomycin C has also shown activity against various trypanosomic infections. The following table illustrates the relative in vivo activity of the antibiotic following subcutaneous administration in mice infected with the species *Trypanosoma congolense* and *Trypanosoma brucei*. The term "effective" is used in the table to denote absence of trypanosomes following administration of the antibiotic whereas the "curative" measure of activity is based upon survival and successful reinfection of the test specimens. (See Toxicity, infra, columns 13–14.)

TABLE V

| Dosage (mg./kg. mouse) | Trypanosoma Species | Results |
|---|---|---|
| 0.25 | congolense | Curative. |
| 0.10 | congolense | Partially curative, partially effective. |
| 0.25 | brucei | Effective. |

In addition to the antimicrobial action of Actinomycin C, it has been found as a result of experiments with animals and clinical testing on humans that the antibiotic substance has a very pronounced and consistently demonstrable cytostatic action. Its cytostatic effect is manifested both on direct application to the cells of malignant animal tumors and in therapeutic experiments on living animals with transplanted tumors. In clinical tests on humans, Actinomycin C has been found to be particularly effective in the treatment of lymphogranulomatosis (Hodgkin's disease) and other characteristic diseases of the lymphatic system such as aleukemic lymphadenomatoses. Indications have also been found for polycythemias and leukemias. Other data relative to this rather unique utility of Actinomycin C are presented under the general heading "Toxicity" which is set forth hereinafter.

As for their respective origin organisms, Actinomycin C is readily distinguishable from Actinomycin A and Actinomycin B of Waksman et al. With regard to its physical, chemical and biological properties, Actinomycin C is more characteristically similar to Actinomycin A than it is to Actinomycin B, but these similarities occur, for the most part, with respect to substantially non-critical characteristics. The following general summary demonstrates only some of the important differences between these three antibiotic substances and other differences will be discussed throughout the text which follows:

TABLE VI

| Characteristic | Actinomycin A | Actinomycin B | Actinomycin C |
|---|---|---|---|
| Melting point °C. | 250 | 255 | 252. |
| Empirical Composition. | $C=59.1\%$; $H=6.81\%$; $N=13.35\%$ $C_{51}H_{69}O_{16}N_{12}$ | $C=57.87\%$; $H=6.4\%$; $N=13.17\%$ $C_{51}H_{68}O_{16}N_{12}$ | $C=59.06\%$; $H=7.07\%$; $N=12.26\%$ $C_{62}H_{89}O_{17}N_{11}$. |
| Specific Rotation $(\alpha)_D$, $C=0.25\%$ in ethanol | $-360°$ (25° C.) | $-367°$ (16° C.) | $-325$ to $-349°$, $\pm 10°$. (25° C.). |
| Solubility Acetone. | Moderate | | Very readily soluble. |
| Diacetyl Derivative. | Yes—Same m. pt. as Actinomycin A. | | None. |
| Leuco-Acetyl Derivative. | Yes—m.pt., 241°C.; $C=58.52$; $H=4.65$; $N=12.04$. | | Yes—m.pt., 253°C.; $C=59.50$; $H=6.95$; $N=11.14$. |
| Molecular weight. | 770–1000 | | |
| Equivalent Weight (upon titration with perchloric acid in glacial acetic acid). | | | 1200 ($\pm 50$). |
| Form of Crystallization (Ethyl-Acetate Solutions). | Vermillion Red Platelets which melt at 250° C. with slow decomposition. | Substantially colorless. | Alizarine-Red Hexagonal Bi-pyramids of melting point 252° C. |
| Yields D-Allo-isoleucine upon acid hydrolysis. | No | No | Yes. |

All Actinomycins heretofore isolated and identified as distinct compounds have been found to have substantially the same absorption characteristics in both the visible and ultra-violet regions. Minor differences over relatively short band widths are customarily encountered but these are not significant enough to actually distinguish one Actinomycin from another in the manner customarily possible with spectral characteristics of other chemical compounds. The only positive method of distinguishing the various Actinomycins is by partition analysis, especially chromatography.

CHROMATOGRAPHIC ANALYSIS

With reference to the single drawing, there is shown a photographic reproduction of a paper chromatogram of the ring partition type which was prepared in accordance with a procedure similar to that described in "Paper Chromatography, a Laboratory Manual" by Richard J. Block et al., page 24, Method VII; wherein the resolution of mixtures of Actinomycin A and Actinomycin C are shown in comparative relationship.

The behavior of the separate antibiotic substances was observed by bringing each onto a filter paper carrier in acetone-butanol solution in semicircular fashion from a capillary. The system of solvents employed consisted of the following two phases:

(1) Aqueous—a 10 percent aqueous solution of sodium m—cresotinate.

(2) Organic—a mixture of 3 parts by volume of Di-n-butyl ether and 2 parts by volume of butanol.

The points where the two antibiotics were brought onto the filter paper have been marked in the drawing by the semi-circular arrows. The filter paper was first moistened with the aqueous phase and the organic phase was then introduced at the center of the circle formed by the double arrows in the drawings. The organic solvent was permitted to migrate outwardly through the respective antibiotic substances, thereby effecting separation of their components according to the laws of partition chromatography.

The photographic reproduction of the resulting chromatogram as shown in the drawing, illustrates clearly that the migration distances of Actinomycin A (lower half), and the corresponding migration distances of Actinomycin C (upper half), are different and that each Actinomycin forms more than one zone. Considering the migration distance of the outermost zone or band, i.e., the migration distance of the $C_3$ component of Actinomycin C, to be unity, and based on the actual migration distances taken from the chromatogram, the relative migration distances of the respective components are shown in the following table:

TABLE VII

| Actinomycin component: | Relative migration distance |
|---|---|
| Actinomycin $C_3$ | 1.00 |
| Actinomycin $C_2$ | 0.69 |
| Actinomycin $C_1$ | 0.52 |
| Actinomycin A (main component) | 0.53 |
| Actinomycin A (second component) | 0.33 |

STRUCTURAL INVESTIGATIONS, TYPICAL REACTIONS AND GENERAL CHARACTERISTICS

In addition to its solubility in acetone, Actinomycin C is also readily soluble in chloroform, benzene and ethyl acetate, but it is only moderately soluble in ethanol. Dilute solutions of the antibiotic in glacial acetic acid or methanol fluoresce with a yellowish-green color under suitable radiation, but solutions of the antibiotic in acetone, benzene or pyridine fluoresce only weakly red or not at all. It is merely sparingly soluble in water and can be precipitated readily therefrom by treatment with ammonium sulfate. The aqueous solution is believed to be colloidal in nature and foams strongly. It is rendered turbid by heating and loses its surface activity, but it becomes clear again when cooled while carbon dioxide is bubbled therethrough, and again becomes capable of foaming strongly upon agitation.

Actinomycin C is readily reducible to a pale-yellow leuco compound which on exposure to air reassumes the characteristic yellow color of the starting compound. Under certain conditions the reduction and reoxidation may pass through a green, obviously semiquinoid intermediate stage. This occurrence is noticeable in particular when the red solution of Actinomycin C in concentrated hydrochloric acid is treated with titanium trichloride. Less pronounced but still evident is the green coloration accompanying the reduction with a little stannous chloride in ethyl acetate or chloroform. The green intermediate stage also occurs when the pale-yellow leuco compound is dehydrogenated with atmospheric oxygen or chloranil ($C_6Cl_4O_2$). The green chloroform solution has relatively sharp absorption bands at 695 and 630 m$\mu$.

Actinomycin C can be extracted from ether by shaking with at least 4% hydrochloric acid solution, the color deepening towards a red. Accordingly, it is basic but so weak as to render impossible any conductometric titration in an alcoholic solution. In hydrochloric acid solution it can be titrated to the pale yellow leuco stage. Molecular weight determinations on this product obtained by catalytic hydrogenation compare favorably with the value of 1200 previously determined as the minimum molecular weight.

One equivalent of Actinomycin C takes up 1.0 mole of hydrogen during catalytic hydrogenation (platinum catalyst in glacial acetic acid). The characteristic yellow color of the solution turns pale in the course of the absorption of hydrogen and becomes yellow again upon admission of air.

Upon the addition of a small amount of concentrated sulphuric acid to the yellow solution in acetic anhydride it turns red and shows an absorption band at 577 m$\mu$. After a short time the solution regains its yellow coloration. The behavior of our antibiotic towards nitrous acid gives no indications pointing to the presence of primary or secondary amino groups. The ninhydrin reaction (Abderhalden test) as well as the other conventional reactions for amino acids and peptides are negative. Nessler's reagent gives with Actinomycin C a grayish-brown Actinomycin by paper chromatography. Exposed to light and air its color is bleached out in a few days, accompanied by a parallel decrease in activity and extinction.

Attempts to elucidate the function of the O- and N-atoms have thus far resulted in the findings that the antibiotic probably contains no methoxy, acetyl or carboxy groups. Hydroxyl groups could not be detected by acetylation. Subjected to reducing acetylation, Actinomycin C yielded a crystalline, pale-yellow compound, the analytical data for which, on the basis of a molecular weight of 1200, would approximate a leucodiacetate. This finding may be considered as evidence for the presence of a quinoid system. Since the reduction product is inactive antibiotically, there is a possibility that acetylating reduction is accompanied by still other reactions. The melting point (corrected) of the crystallized compound was found to be 253° C.

Acid hydrolysis of Actinomycin C under mild conditions yields two orange-red water-soluble bases. The one is adsorbed as a yellow zone (zone base) in chromatographic adsorption on aluminum oxide from water, while the other goes into the filtrate (elutriation base). In the beginning only the elutriation base forms; in subsequent stages of the hydrolysis its amount decreases in favor of the zone base. The surface-active aqueous solutions of the two bases become turbid on heating. The bases are precipitated by salts. Zone base and elutriation base form picrolonates (a chloroaurate was also formed of the elutriation base), the assays of which indicate that no decomposition or only slight decomposition of the molecule takes place during the mild hydrolysis. Both bases give small omunts of nitrogen upon determination of amino nitrogen according to the method of Van Slyke. By action of the nitrous acid, water-insoluble acid compounds are formed which enter into the Liebermann reaction with phenol and sulphuric acid to form nitroso compounds, and again assume the properties of the starting materials after brief heating with concentrated hydrochloric acid.

Upon intensive hydrolysis with sulphuric acid (30%), $NH_3$ and $CO_2$ in a ratio of 2:1 are split off from Actinomycin C. A brownish-black precipitate separates which is probably derived from the amino acid-free part of the molecule. Besides yellowish-red fractions it contains black, melanin-like constituents. During hydrolysis, a crystalline mixture of amino acids is obtained amounting to about 60 percent of the starting materials. For purposes of identifying the amino acids and their configuration it was necessary to isolate them in a substantially pure form. Paper chromatography was employed for this purpose. Ten sheets, each carrying about 10 mg. of the amino acid mixture were suspended in glass jars in the manner conventionally employed for two dimensional paper chromatography. On developing the chromatograms, band-like zones are formed which are cut out and eluted in accordance with the indications of a test strip treated with ninhydrin. When o-cresol was used as the mobile phase five and, occasionally, six zone bands appeared on the sheets which were designated Zones I through VI in order of increasing $R_F$ values, i.e., from the top downwards. Zones I and VI were always sharply outlined whereas Zones II, III and IV overlapped frequently. Complete separation was successfully accomplished on eluting them together and subjecting them to a second chromatographic analysis with butanol-20% acetic acid as the mobile phase. During the second analysis, the sequence of the fractions remained the same. The microbiological amino acid test was used to check the analytical findings and to provide qualitative data on the amino acid content of the hydrolyzate. The results of microbiological analysis show Actinomycin to contain the following amino acids:

L-threonine
Sarcosine
D-valine
D-alloisoleucine
L-proline
N-methyl-L-valine

Summarizing the above results, Actinomycin C upon acid hydrolysis is found to form the same amino acids as Actinomycin B, but in addition to those formed with Actinomycin B, there is formed D-alloisoleucine. D-isoleucine or D-alloisoleucine is not yielded by either Actinomycin A or Actinomycin B. To our knowledge alloisoleucine has heretofore never been found in nature. The occurrence of the D-configuration is not surprising, for, amino acids of similar configuration have also been found in other antibiotics, such, for example, D-leucine in Gramicidin and Subtilin.

When Actinomycin C is subjected to vigorous acid hydrolysis, the chromophoric portion of the molecule, as previously mentioned above, is converted into a melanin-like mass, which amounts to about 25 percent of the starting material. If the chromophore component of the antibiotic is to be split off from the peptide component in an undecomposed state, the acid hydrolysis is effected in a reducing medium. The cleavage of Actinomycin C with addition of excess phosphonium iodide yields a colorless crystallized compound of melting point 115° C. (uncorrected).

The chromophoric system of Actinomycin C is swiftly decomposed by aqueous or alcoholic alkali hydroxide. On the other hand, boiling with barium hydroxide solution produces a decomposition product from which it is possible to separate a red crystallized compound which does not split off any additional amino acid upon attempted further hydrolysis. This compound is either the dye component contained in the product itself, or a conversion or decomposition product of it. This colored product of Actinomycin C which is free of amino acids may be termed despeptido-Actinomycin C. It crystallizes from nitro-benzene in the form of deep-red needles. It decomposes at temperatures above 300° C. without melting and can be sublimed in high vacuum without decomposition. The analytical value corresponds to the empirical formula $C_{15}H_{11}O_5N$, which conforms with the molecular weight of 285, determined ebullioscopically in glacial acetic acid.

The quantity of acetic acid (1.70 moles) which forms during the chromic acid oxidation of this product indicates the presence of two lateral methyl groups. The Zerewitinoff determination yielded a value of 4.4. Nearly 1 mole of ammonia was formed by alkaline fusion.

Despeptido-Actinomycin C exhibits basic as well as acid properties. It can be extracted from ether with hydrochloric acid (5 N) and with sodium bicarbonate (color of solution, brown). The color of the solution in caustic soda solution is wine-red. In countercurrent distribution between a phosphate buffer at pH 8 and butanol, it proves to be uniform.

Acetylation produces an orange-colored crystallized triacetate with a melting point of 164° C. (uncorrected). Upon dissolution in methanol, it is converted into a red crystallized compound of melting point 210° C. (decomposition), which reconverts into the starting material on boiling in toluene or, better, in acetic anhydride.

On combination with stannous chloride, despeptido-Actinomycin C, in contrast to the decomposition products of the mild acid hydrolysis, does not show green coloring. A deep-green color does occur when its strongly hydrochloric acid solution is mixed with titanium trichloride. As pointed out above, this reaction is likewise manifested by Actinomycin C itself. No despeptido-Actinomycin C can be obtained from the cleavage products of mild acid hydrolysis by boiling with barium hydroxide solution.

The cultivation of the strain producing Actinomycin C may be carried out either in known fashion by surface culturing or by submerged culturing. It has been found that the submerged method results in greater yields of the antibiotic and lessens considerably the time necessary to obtain optimum concentration of Actinomycin C within the nutrient medium. For these reasons, the submerged culture type of operation is preferred. After growth has been completed, the mycelium may be separated from the broth now containing the antibiotic Actinomycin C, by extraction processes or adsorption processes or both. Organic solvents are suitable as extracting agents; butyl acetate being the preferred agent. When adsorption processes are employed in separating Actinomycin from its impurities, the crude product may be dissolved in an organic solvent and chromatographically separated by means of aluminum oxide. The product may be recrystallized from a mixture consisting of equal parts of ethyl acetate and benzene and is then found to have a melting point of 254° C. which might be attributable to the fact that the antibiotic stubbornly holds the solvent. Alternatively, the antibiotic may be adsorbed from the broth onto activated carbon and eluted from the carbon by means of organic solvents or water at a suitable pH, in a manner well known in the industry.

The following examples are given as illustrations of the manner in which Actinomycin C may be formed, recovered and purified. Since pure crystalline Actinomycin C is so highly efficacious for the purpose intended, little work has been done to date on the investigation of salts of the antibiotic but it should be understood that the conventional crystalline salts may be expected to be equally efficacious and are considered to be within the scope of the invention.

*Example 1*

FORMATION AND RECOVERY OF ACTINOMYCIN C BY ADSORPTION

The strain, *Streptomyces chrysomallus* was cultivated on a nutrient medium containing 3% of agar in the following nutrient liquor:

Liquid nutrient:
  Tap water _____ kg___ 500
  Glycerol _____ kg___ 10
  Potassium nitrate _____ kg___ 5
  Potassium diphosphate _____ kg___ 0.5
  Sodium chloride _____ kg___ 1.0
  Magnesium sulphate _____ gm___ 25
  Ferrous sulphate _____ gm___ 5
  Precipitated calcium carbonate _____ gm___ 5

For the preliminary culture, 300 cc. Erlenmeyer flasks were charged with 50 cc. each of the liquid nutrient, sterilized and inoculated with the strain of *Streptomyces chrysomallus*. The flasks were shaken at 30° C. in a shaking apparatus for about 5 days, a submerged culture of the microorganism being formed thereby. The nutrient medium assumed a reddish-yellow coloration. The culture was bacteriologically tested as to purity and usefulness. The antibiotic activity was also tested and inhibitory values of 1:200 to 1:600 were attained against *Staphylococcus aureus*.

In preparing the chief culture, the nutrient solution was sterilized at 120° C. for one hour in a 1000 liter vessel provided with a stirrer and sparger. The vessel was then cooled to 30° C. and inoculated under sterile conditions with about one liter of the preliminary culture. The inoculated culture was then incubated with stirring at 29–30° C. for six days, air being passed therethrough during the incubation period. The air supply amounted to 500 liters per minute at the start; excessive foaming being prevented by reducing the current of air. The pH of the solution was at first 6.5 to 6.9 and increased to 8.8 to 9.1 during incubation. The solution took on a reddish-yellow coloration and towards the end of the incubation period, the Actinomycin C partly precipitated in reddish flakes which floated on top of the liquid while the mycelia sank to the bottom.

CRUDE ACTINOMYCIN C

The culture liquor was removed from the vessel and stirred at room temperature in a 100 liter stirring vessel with butyl acetate distilled in vacuo, the butyl acetate amounting to 200 kg. per 500 kg. of the culture liquor. The mixture was left standing overnight, and on the following morning, a deeply yellow-colored butyl acetate solution was separated in a centrifuge from the culture filtrate. The butyl acetate was distilled off under reduced pressure at 60° C. The residue, a reddish-resinous material constituting crude Actinomycin C, was dried in vacuo. The yield amounted to 200 grams.

PURIFIED ACTINOMYCIN C

Crude Actinomycin C can be purified most efficasiously by chromatographic adsorption. One part by weight of the crude substance was dissolved in four parts by weight of benzene, and the resulting benzene solution was filtered by means of a folded filter and then filtered in a glass column over 10 parts by weight of aluminum oxide Merck (Brockmann) previously pasted with benzene. In the upper third of the column, some yellow to red-brown colored zones were formed. After passage of the dyestuff solution, some further benzene was added to the column, and, thereafter, ethyl acetate was added in an amount such that the solution leaving the column is colored only slightly yellow. The solution obtained by passing benzene through the column and the solution obtained by passing ethyl acetate through the column were collected separately. While the benzene and ethyl acetate were being passed through the column, the zones shifted more and more towards the bottom of the column, and with continued addition of ethyl acetate, the Actinomycin C dissolved and the solution ran out at the bottom of the column, at which point it was collected. The addition of ethyl acetate was interrupted when the liquid leaving the column was only weakly yellow, as pointed out hereinbefore. At this time, the column still contained a dyestuff which was soluble in warm alcohol. The two chief fractions were obtained, however, viz., the benzene solution and the ethyl acetate-fraction containing most of the Actinomycin C.

In a series of operations employing the procedure described above, the average yield of Actinomycin C— after distilling off the ethyl acetate—amounted to 40–60% of the crude starting products.

*Example II*

FORMATION AND RECOVERY OF ACTINOMYCIN C BY EXTRACTION

In preparing the preliminary or master culture, the strain of *Streptomyces chrysomallus* is cultured on a medium containing 3% agar and the liquid nutrient described above in connection with Example I. For subculturing of the master culture, other suitable culture media can also be used. Any carbohydrate medium will suffice.

For the inoculum, 110 cc. each of the nutrient liquid are placed in 1000 cc. Erlenmeyer flasks, sterilized and inoculated with the inoculum which is obtained from the master culture. The flasks are shaken on a shaking machine for approximately 3–5 days at a temperature of 30° C., whereupon a submerged culture of the microorganism is formed and the nutrient acquires a reddish-yellow color. The inoculum is then tested bacteriologically for purity and suitability. At the same time an antibiotic assay is performed.

Sterilization of the nutrient is conducted at 120° C. in a 1500 liter fermenter equipped with a mechanical stirrer and aerating equipment. Subsequently it is cooled to 30° C. and inoculated under sterile conditions with 2 liters of inoculum, added in bomb form. The charge is then fermented at 29–30° with stirring and aeration for 4–6 days. As for the process of Example I, the aeration rate is initially 500 liters per minute but is reduced if strong foaming occurs. Alternately, lard oil may be added as a defoaming agent. The pH of the broth is regulated in the same manner as for the process described in Example I.

Towards the end of the fermentation period a flocculent reddish precipitate of Actinomycin C is formed which separates on the top of the solution upon standing, while the mycelia settles to the bottom as described in Example I. The mycelium and supernatent fluid are separated by any suitable procedure, such, for example, through centrifuging.

The broth is extracted exhaustively with butyl acetate in a centrifugal extractor. Thus, the clear broth obtained by centrifuging 1000 kg. of fermented broth for removal of the mycelia, is extracted in a centrifugal extractor with 200 liters and then 100 liters of butyl acetate. The mycelium is suspended in 100 liters of butyl acetate and the solvent removed by filtration. The combined butyl acetate extracts are concentrated in vacuum to two liters at 60° C. After refrigeration for several days, the reddish-brown crude precipitate which is formed is filtered off, washed with petroleum ether and dried in a vacuum oven. The yield realized is 50 to 100 grams.

*Example III*

PREPARATION OF CRYSTALLINE ACTINOMYCIN C

One part by weight of the ethyl acetate-fraction of Example I is dissolved in a mixture of 7 parts of ethyl acetate and 7 parts of benzene. The solution is filtered and evaporated under reduced pressure to about one-fourth of its initial volume. The residual solution is cooled to room temperature and mixed with the same volume of carbon disulphide distilled over mercury. Upon treatment of the solution with carbon disulphide, Actinomycin C precipitates in crystalline form either spontaneously or after rubbing with a glass rod. The precipitated product is removed by suction and washed, after standing 24 hours at 0° C.; an ethyl acetate-carbon disulphide mixture being used first and then ligroin. The crystalline product is dried on a water bath. The yield is approximately 70 percent of the purified Actinomycin C charge.

Alternatively, 100 gm. of the crude product from Example II are boiled under reflux, with a mixture of equal parts (700 cc.) of ethyl acetate and benzene and filtered while hot. The resulting filtrate is reduced to half its volume in vacuum and refrigerated for 48 hours. The crystals which precipitate are filtered off, washed with 100 cc. of cold benzene-ethyl acetate mixture and dried in vacuum. The yield is then 70 gm. of crystalline Actinomycin C per 100 gm. of the crude product. The mother liquor contains additional amounts of impure Actinomycin C which are relatively hard to purify.

Example IV
PREPARATION OF THE PERCHLORATE OF ACTINOMYCIN C

A heated solution of 176 mg. of Actinomycin C in 0.5 cc. of butanol, after cooling, is treated with 0.16 cc. of a 50 percent perchloric acid. The perchlorate salt (180 mg.), crystallizes in fine, red needles. The salt was washed with ether but could not be recrystallized, indicating the probable instability of the perchloric acid salt in ether. On the basis of a molecular weight of 1200, the initial crystalline product was found to contain 3 moles of perchloric acid. Its melting point is 192° C. (corrected).

Example VI
PREPARATION OF ACTINOMYCIN C IN THERAPEUTIC FORM

Actinomycin C corresponding to 10 grams of pure 100% Actinomycin C is dissolved in 3 liters of pure ethanol by heating to 60° C. This solution is then filtered under sterile conditions through a sterile 6 cm. Seitz filter pad. Afterwards the filter is rinsed with 200 cc. of pure ethanol which is kept separately. The sterile alcoholic solution of Actinomycin C is sprayed with a spray gun onto 10 kg. of sterile cane sugar which has been previously ground extremely fine in a micronizer. Subsequently the spray gun is rinsed with the alcohol used for rinsing in the previous operation. The sprayed sugar is dried at 40° C. in a vacuum oven to remove the alcohol completely. The dry product is pulverized at 4 atmospheres of pressure in a micronizer and subsequently mixed thoroughly.

The pulverized mixture is provided in vial form. Before filling, the product is dried again at 40° C. in a vacuum oven. Care is exercised throughout to insure that moisture and sunlight are excluded.

The product is provided in 4.8 cc. vials, in quantity corresponding to 200 gamma active material plus 3% overfill, or usually, 206 mg.

TOXICITY AND PHARMACOLOGICAL DATA

Actinomycin A is extremely toxic; 10 mcgm. suffices to kill a mouse within 24–48 hours. For this reason, its practical use as an antibiotic is destroyed.

In investigations conducted with Actinomycin C relative to its toxic equivalent, the first experiments were carried out with large doses of the preparation. These experiments demonstrated that in rabbits intravenous administration of only 1 mg./kg. may cause death within 24 hours with minor convulsions preceding the collapse. Pregnant animals were found to succumb within 24 hours following intravenous administration of doses of 0.5 mg./kg. After subcutaneous administration of 0.05 mg. per kg. of rabbit, appetite and body weight declined, and these animals also died following about 10 doses.

Dissection of these animals which had been treated with lethal doses revealed pale and normal-appearing livers, pale kidneys with hyperemia of the outer medullary layer and hyperemic adrenals. The heart usually was slack, and there were diffuse generalized hemorrhages comparable to those found in acute arsenic poisoning.

In further tests, rabbits were given 20 subcutaneously injected doses of 10, 5, 2 and 1 γ/kg. in the course of 3 weeks. All the animals survived after 4 weeks of observation following the last injection. All the animals showed normal increase in body weight during and after the treatment. The urine remained normal at all times. After 20 doses of 10 and 5 γ/kg. the morphological blood picture remained unchanged. On the 14th day following treatment the hemoglobin content fell from 75% to 46% and from 75% to 59%, respectively, and did not rise again until two weeks later at which time it rose to about 70%. The fluctuation of the leukocyte number was approximately commensurate. The animals developed resistance only when they had received 2 and 1 γ/kg. subcutaneously about 20 times.

The toxicological effects of Actinomycin C manifest themselves only after a latency period of several days. When a series of mice, for example, are treated with an intravenous dose of 1 mg./kg. of the antibiotic, the first fatalities occur after 3–4 days. Most of the fatalities occur after 5–8 days.

These initial investigations demonstrated that Actinomycin C is a strong cell poison which acts primarily upon the capillaries following a single injection of several times the lethal dose. In therapeutic animal experiments, Actinomycin C exhibits a clearly demonstrable inhibitory effect on the growth of experimental malignant tumors. The same effect is also observed in direct action on the tumor cells with ensuing transplantation, so that the inference is warranted that the compound acts against the proliferating cells themselves. Investigations on cells of Lieberkuhn's crypts in the mouse have disclosed that a single intravenous injection causes an inhibition of the cell division, which persists for about 22 hours, so that a return to normal values is noted only about 24 hours later. The concentrations of Actinomycin C for demonstration of the cytotoxic effect are extremely low on a comparative basis with other known cytostatic agents.

Particularly striking is the discovery that the effects of small doses administered over an extended period cumulate to some degree in the course of treatment despite the water-solubility of the preparation and the consequent rapidity of its excretion. This characteristic permits the slow infiltration of small doses, certain to be innocuous when given singly, over a prolonged period, with constant observation of the patient, until the optimum effect is achieved. The serious risk of individual overdosage or underdosage commonly encountered in treatment with highly active cytostatic preparations can therefore be avoided more easily. Furthermore, the need for insoluble forms of the antibiotic, which customarily characterized the development of other antibiotics, is greatly mitigated.

A property of great biological interest exhibited by the antibiotic is its marked affinity for the lymphatic system, which manifests itself experimentally in the mouse by a considerable reduction of spleen size with atrophy of the malphigian bodies. A decrease in the weight of the spleen from about 114.5 mg. to 34.5 mg. was observed in mice weighing 20 gm. after three intravenous injections of 0.01 mg. daily. With respect to local tolerance, animal experimentation has shown that subcutaneous and intramuscular application is not perfectly tolerated. Accordingly, in clinical use the only appropriate method of administration is by the intravenous route.

As a result of information gleaned from animal experimentation, Actinomycin C was released for clinical evaluation. The antibiotic enables the physician to influence medicinally, in an entirely new form of therapy, diseases in which the clinical picture is dominated by enlargement of the lymph nodes and of the spleen. As a result of over 3 years of clinical investigations, Actinomycin C has been found to be particularly effective in the treatment of diseases of these symptoms, such, for example, as lymphogranulomatosis. While the antibiotic has not been established as a cure for such diseases, it does produce palliative relief and at least temporary remission of symptoms.

Actinomycin C in clinical application is injected intravenously. Vein irritations are seldom encountered. Paravenous application may lead to infiltrations but these regress rapidly without lesions. The minimum total dose from which success can be determined is approximately 5000 mcgm. The following individual dosage has generally proved most favorable for adults from the points of view of tolerance and efficacy:

| | |
|---|---|
| 1st day | 100 mcgm. (i.v.) |
| 2nd day | 150 mcgm. (i.v.) |
| From 3rd day | 200 mcgm. (i.v.) |

Daily doses of 200 mcgm. are generally well tolerated. Only at higher doses do individual differences in reactions occur, which have to be ascertained from case to case to adjust the dosage appropriately when refractory cases require larger doses. Daily doses in excess of 200 mcgm. should not be given in a single injection but should be divided. Interruptions of the therapy should be avoided.

The individual duration or total dose administered depends entirely on the clinical picture. Many cases, notably recent ones and those which are only mildly advanced, respond with remission to total doses of about 5000 mcgm. If there is no improvement or unsatisfactory improvement following the complete dosage, a combination of the treatment with deep X-irradiation is found to be in order. X-ray doses then required are substantially lower than those required without prior Actinomycin C treatment. In cases of recurrence, it has been found that treatment with Actinomycin C proves just as effective as the initial regime.

HETEROGENEOUS COMPOSITION OF ACTINOMYCIN C COMPONENTS $C_1$, $C_2$ AND $C_3$

The antibiotic substance Actinomycin C obtained from the strain *Streptomyces chrysomallus*, crystallizes in complete homogeneity and cannot be separated into components either by fractional crystallization or chromatographic adsorption. According to classical criteria of purity, it is a homogeneous substance. An indication was obtained that perhaps these criteria were not controlling with respect to the Actinomycins, in that, initial Actinomycin C preparations obtained at different times and under varying conditions showed differences in solubility characteristics and analytical values. Furthermore, some of these samples contained relatively low valine contents at variance with prior determinations. This led us to believe that perhaps the unitary crystalline substance precipitated from our culture medium was not homogeneous but a composite of several antibiotic substances.

Unequivocal proof of the heterogeneity of Actinomycin was advanced by its fractional countercurrent distribution in a system of ether and hydrochloric acid (5.6%). After forty stages in the system, a distribution curve was obtained which clearly indicated that our preparation was composed of at least two components. It was apparent that in order to achieve a clean separation of the components of Actinomycin C, the countercurrent distribution must be extended to at least 150 stages but it was also readily apparent that this could not be done in the ether-hydrochloric acid system because of the decomposition effect of the acid on the antibiotic during the prolonged period required for such a treatment. The acid was replaced by urea, a substance which would take the Actinomycin C into the aqueous phase in adequate concentration and would be substantially inert even upon protracted exposure to the antibiotic. A 30% aqueous solution of urea was combined with a mixture of methyl butyl ether and n-dibutyl ether (7:3) and, when the Actinomycin C was distributed over 180 stages, a distribution curve was obtained which showed that Actinomycin C is a composite of 3 separate Actinomycins. These were isolated in crystalline form and designated by us as Actinomycin $C_1$, $C_2$ and $C_3$ according to the sequence of their maxima on the distribution curve.

Proof that the components of Actinomycin C thus obtained could not be further separated was obtained by carrying the flow to a substantially greater number of stages. A 496-stage distribution led to a distribution curve characteristic of a homogeneous substance.

After separation of the components $C_1$, $C_2$ and $C_3$ had been effected by countercurrent distribution, it was decided to attempt a similar resolution by paper chromatography. It was possible to obtain a smooth resolution of Antinomycin C in the ring paper chromatogram and its three components formed three widely separated yellow rings. When the dried chromatograms are placed in an atmosphere containing HCl, the yellow areas turn a deep red owing to salt formation and thereby become more easily discernible, which is an advantage for purposes of photographic reproduction. The chromatogram substantiated the presence and meaning of the three separate zones obtained during the chromagraphic comparison of Actinomycin C with Actinomycin A as shown and heretofore explained, in connection with the chromatographic reproduction of the drawing. On the basis of these results, the respective zone of each component has been indicated on the drawing in accordance with the $C_1$, $C_2$ and $C_3$ designations applied by us.

With the aid of ring partition chromatography it becomes possible to accurately compare Actinomycins produced by independent strains of Streptomyces, to examine them as to homogeneity of makeup and to determine whether strains are developed by mutations capable of forming new Actinomycins. Further, the stability of Actinomycin solutions or of Actinomycin-containing preparations can be easily controlled by this method of analysis.

According to their chemical compositions, all of the Actinomycin C components are probably chromopeptides, characterized in that a yellow pigment constituent in their molecules is linked to a polypeptide residue. The amino-acid composition of the peptide residue of the three component-Actinomycins is shown in the following table:

TABLE VIII

| Amino Acid | Components | | |
|---|---|---|---|
| | $C_1$ | $C_2$ | $C_3$ |
| L-Threonine | + | + | + |
| Sarcosine | + | + | + |
| L-Proline | + | + | + |
| D-Valine | + | + | — |
| N-Methyl-L-Valine | + | + | + |
| D-alloisoleucine | — | + | + |

Quantitative analysis of the amino acid content of Actinomycin $C_1$, $C_2$ and $C_3$ revealed approximately the following molar ratios:

TABLE IX

| Amino Acid | Components | | |
|---|---|---|---|
| | $C_1$ | $C_2$ | $C_3$ |
| L-Threonine | 0.9 | 1.4 | 1.2 |
| Sarcosine | 1.5 | 1.4 | 1.4 |
| L-Proline | 1.7 | 1.9 | 2.1 |
| D-Valine | 1.0 | 0.9 | |
| N-Methyl-L-Valine | 1.7 | 1.9 | 2.0 |
| D-Alloisoleucine | | 0.9 | 2.0 |

The possibility suggested itself that a strain of microorganism which yielded but one Actinomycin at first, might in due time give rise to a population of several variants or mutants, each capable of producing a specific, distinct Actinomycin. On the basis of this assumption, however, it did not seem feasible that the non-homogeneous nature of our Actinomycin C could be due to the biological heterogeneity of our strain *Streptomyces chrysomallus*. If this was the case, it was to be expected that the microbiological separation of the variants or mutants would lead to strains capable of producing only one Actinomycin, and would thereby yield, in direct fashion, the same results that we obtained through resolution of Actinomycin C.

A thorough microbiological investigation demonstrated that our strain at that time was heterogeneous in nature. A number of cultures which had been grown from a single spore of our strain (monospore cultures) differed from each other morphologically and in yield of Actinomycin C. With some the yield was low while with others it was relatively high. The Actinomycin formed by these pure strains was isolated and examined for homogeneity, first by the countercurrent distribution method and then by paper chromatography. All preparations yielded the three zones of Actinomycin $C_1$, $C_2$ and $C_3$.

It was therefore established that homogeneous strains developed from monospore cultures are also capable of producing several Actinomycins and that the biological heterogeneity of our original strains was not responsible for the heterogeneous nature of our antiobiotic, Actinomycin C, derived therefrom.

It is believed that Waksman's Actinomycin A is nearly homogeneous in nature, but Actinomycin B has been found to be a composite of a chief component, $B_2$, and small quantities of two other Actinomycins, $B_0$ and $B_1$. A determination was made to ascertain which, if any, of the Actinomycin components isolated from Actinomycin C was the same, or similar to Actinomycin A or Actinomycin B. Once again, resort was had to chromagraphic analysis. In evaluating these findings, account must be taken of the fact that the results of paper-chromatographic comparison is unequivocal only in situations where different $R_F$ values are obtained. Two Actinomycins which differ in $R_F$ values are of a certainty, different, but conversely, two chromatographically similar ($R_F$) Actinomycins are not necessarily the same chemical compound as will appear from the following results. All three of the components, Actinomycin $C_1$, $C_2$ and $C_3$ naturally show different $R_F$ values from each other. Actinomycin $C_1$, $C_2$ and $C_3$ also show different $R_F$ values than the value obtained for Actinomycin B, and, Actinomycin $C_2$ and $C_3$ differ in $R_F$ value from Actinomycin A. Actinomycin $C_1$ and Actinomycin A would appear to have identical $R_F$ values.

Investigations and experiments have shown, therefore, that the Actinomycin-forming Streptomyces strains can be divided into the following groups, as detected to date:

(1) Strains producing Actinomycin A;
(2) Strains producing Actinomycin B (composite of Actinomycin $B_0$, $B_1$ and $B_2$); and
(3) Strains producing Actinomycin C (composite of Actinomycin $C_1$, $C_2$ and $C_3$).

A complete process for resolving the component-Actinomycins $C_1$, $C_2$ and $C_3$ from Actinomycin C has been described in United States patent application Serial No. 375,059, which was filed on August 18, 1953.

The present application is a continuation-in-part of our copending United States application, Serial No. 183,300 which was filed on September 5, 1950, and now abandoned.

Having thus described our invention, what it is desired to secure by Letters Patent is:

1. A process for producing an Actinomycin C fermentation broth, which comprises cultivating a strain of Streptomyces chrysomallus in an aqueous, nutrient-containing, carbohydrate solution under aerobic conditions, until substantial antibacterial activity is imparted to said solution.

2. A process for producing Actinomycin C, which comprises cultivating a strain of Streptomyces chrysomallus in an aqueous, nutrient-containing, glycerol solution under aerobic conditions until substantial antibacterial activity is imparted to said solution, and then recovering Actinomycin C from the fermentation broth.

3. A process as claimed in claim 2, wherein the recovery of Actinomycin C includes the step of extracting the antibiotic into an organic solvent selected from the group consisting of butyl acetate, benzene, and ethyl acetate and mixtures thereof.

4. A process as claimed in claim 2, wherein the recovery of Actinomycin C includes the step of adsorption upon aluminum oxide in an organic solvent.

5. A process as claimed in claim 2, wherein the fermentation broth is filtered to separate the mycelium, the clear broth is extracted into an organic solvent, the filtrate is extracted into an organic solvent, and the combined extracts are treated for the recovery of Actinomycin C.

6. A process as claimed in claim 2, wherein Actinomycin C recovered from the fermentation broth is heated to an elevated temperature in an organic solvent solution and treated for the recovery of purified Actinomycin C.

7. A process for producing Actinomycin C, which comprises cultivating a strain of Streptomyces chrysomallus in an aqueous, nutrient-containing, carbohydrate medium under submerged aerobic conditions until substantial antibacterial activity is imparted to said solution, and then recovering Actinomycin C from the fermentation broth.

8. A process for producing Actinomycin C, which comprises cultivating a strain of Streptomyces chrysomallus in an aqueous, nutrient-containing, carbohydrate medium under submerged aerobic growth conditions at a temperature of 29–30° C. for a period of 4–6 days, and then recovering Actinomycin C from the fermentation broth.

9. The antibiotic substance Actinomycin C which is produced by cultivating a strain of Streptomyces chrysomallus in an equeous, nutrient-containing, carbohydrate medium under submerged aerobic growth conditions at a temperature of 29–30° C. for a period of 4–6 days to impart substantial antibacterial activity to said medium; said antibiotic substance as recovered from the resultant fermentation broth being sparingly soluble in water, very readily soluble in acetone, chloroform, ethyl acetate, and benzene, and moderately soluble in ethanol; having a melting point with decomposition of 252° C., an equivalent weight upon titration with perchloric acid in glacial acetic acid of 1200±50, and the approximate analytical composition:

C=59%
H=7%
N=12%
O=22% (by difference)

which precipitates from ethyl acetate solutions in the form of alizarine-red, hexagonal bipyramids; whose leuco-acetyl derivative has a melting point of 253° C. and contains the elements carbon, hydrogen, nitrogen and oxygen in the following proportions:

C=59.50%
H=6.95%
N=11.4%
O=22.15% (by difference)

which antibiotic substance upon acid hydrolysis yields a crystalline mixture of amino acids consisting of:

L-threonine
Sarcosine
L-proline
D-valine
N-methyl-L-valine, and
D-alloisoleucine and which, when subjected to fractional countercurrent distribution in an ether-urea system, or when subjected to chromatographic resolution, yields the three distinct component Actinomycins, Actinomycin $C_1$, Actinomycin $C_2$, and Actinomycin $C_3$.

References Cited in the file of this patent

UNITED STATES PATENTS

| | | |
|---|---|---|
| 2,378,876 | Waksman | June 19, 1945 |
| 2,516,080 | Sobin | July 18, 1950 |

FOREIGN PATENTS

| | | |
|---|---|---|
| 279,103 | Switzerland | Mar. 1, 1952 |
| 944,395 | Germany | June 14, 1956 |

OTHER REFERENCES

Nature, June 9, 1956, p. 1059.

Brockmann et al.: "Angewandte Chemie, vol. 68, No. 2, pp. 66–71.

Rousos: J. Chem. Soc., 1956, pp. 2469–2470.

Waksman: J. Biol. Chem., vol. 142, 1942, pp. 519–527.

Bergey's Manual of Determinative Bacteriology, 6th ed., 1948, pp. 929–933, 936–944.

Waksman: The Actinomycetes, The Chronica Botanica Co., pp. 94–97, 69–74, 75, 116, 117, 193, 209, 1950.

Hans Brockmann et al.: "Actinomycin C," Naturwissenschaften, 36, No. 12, pp. 376–7 (1949).

Waksman: Antibiotics and Chemotherapy, May 1954, pp. 502–510.

Vining et al.: Science, Sept. 3, 1954, vol. 120, No. 3114, pp. 389–390.

Shimkin et al.: Annals Int. Med., vol. 42, No. 1, pp. 136–153, January 1955.